United States Patent
Wu et al.

(10) Patent No.: US 10,783,684 B2
(45) Date of Patent: Sep. 22, 2020

(54) METHOD AND DEVICE FOR DISPLAYING IMAGE

(71) Applicant: BEIJING XIAOMI MOBILE SOFTWARE CO., LTD., Beijing (CN)

(72) Inventors: Xiaojun Wu, Beijing (CN); Xingsheng Lin, Beijing (CN); Binglin Chang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/201,094

(22) Filed: Nov. 27, 2018

(65) Prior Publication Data

US 2019/0180486 A1    Jun. 13, 2019

(30) Foreign Application Priority Data

Dec. 12, 2017    (CN) .......................... 2017 1 1315256

(51) Int. Cl.
| | |
|---|---|
| *G09G 5/00* | (2006.01) |
| *G06T 11/60* | (2006.01) |
| *G06T 19/00* | (2011.01) |
| *G06K 9/00* | (2006.01) |
| *H04N 21/4728* | (2011.01) |
| *G06T 11/00* | (2006.01) |

(52) U.S. Cl.
CPC .......... *G06T 11/60* (2013.01); *G06K 9/00671* (2013.01); *G06T 11/00* (2013.01); *G06T 19/006* (2013.01); *H04N 21/4728* (2013.01); *G06T 2200/24* (2013.01)

(58) Field of Classification Search
CPC .... G06K 9/00671; G06T 11/60; G06T 19/006
See application file for complete search history.

(56) References Cited

U.S. PATENT DOCUMENTS

| 6,166,744 A | 12/2000 | Jaszlics et al. |
| 2010/0287511 A1 | 11/2010 | Meier et al. |

(Continued)

FOREIGN PATENT DOCUMENTS

| AU | 1797099 A | 6/1999 |
| DE | 102007045834 A1 | 4/2009 |

(Continued)

OTHER PUBLICATIONS

Extended European Search Report dated Feb. 27, 2019 in EP 18211569.1-1208, Feb. 2019.

(Continued)

*Primary Examiner* — Charles Tseng
(74) *Attorney, Agent, or Firm* — Syncoda LLC; Feng Ma

(57) ABSTRACT

A method for displaying an image includes: receiving a setting instruction for performing upper layer display on an image of a target real object; determining image range information of the image of the target real object in a scene image frame upon the scene image frame is captured; acquiring the image of the target real object in the scene image frame based on the image range information; and setting an image of a preset target virtual object on an upper layer of the scene image frame, and setting the image of the target real object on an upper layer of the image of the target virtual object and the scene image frame based on the image range information.

17 Claims, 6 Drawing Sheets

(56) References Cited

U.S. PATENT DOCUMENTS

| | | |
|---|---|---|
| 2012/0314942 A1 | 12/2012 | Williams |
| 2014/0368535 A1* | 12/2014 | Salter ................. G06F 3/011 |
| | | 345/619 |
| 2016/0314622 A1* | 10/2016 | Davis .................. G06T 19/006 |
| 2017/0011558 A1 | 1/2017 | Meier et al. |
| 2018/0082117 A1* | 3/2018 | Sharma ................. G06T 7/73 |
| 2018/0107876 A1* | 4/2018 | Lee .................... G06F 3/1243 |

FOREIGN PATENT DOCUMENTS

| | | |
|---|---|---|
| EP | 2206089 B1 | 7/2010 |
| JP | 2010541053 A | 12/2010 |
| JP | 5133418 B2 | 1/2013 |
| WO | 9927496 A1 | 6/1999 |
| WO | 2009040093 A1 | 4/2009 |

OTHER PUBLICATIONS

Breen D E et al: "Interactive Occkusion and Automatic Object Placement for Augmented Reality", Computer Graphics Forum, Wiley-Blackwell Publishing LET, GB, vol. 15, No. 3, Aug. 26, 1996, pp. 11-22, XP002515919, ISSN:0167-7055, DOI: 10.1111/1467-8659.1530011. pp. C-13-C-16, sections 4.1, 4.2; figures 1,5.

* cited by examiner

METHOD AND DEVICE FOR DISPLAYING IMAGE

CROSS-REFERENCE TO RELATED APPLICATIONS

This application claims priority to Chinese Patent Application 201711315256.1, filed on Dec. 12, 2017, the disclosure of which is incorporated herein by reference in its entirety.

BACKGROUND

Augmented Reality (AR) and Virtual Reality (VR) technologies have been more and more widely applied in daily lives. A user can experience AR visual effects, for example, via AR Application Programs (APPs or Applications) installed in a mobile phone. When the user opens an AR APP, the mobile phone can activate an image capturing function of a camera to acquire an image in the environment and display the image of the scene in an interface of the AR APP. The user can click to select an image of a target virtual object from images of multiple virtual objects, for example in a library and displayed at the boundary of the interface of the AR APP. Then the image of the target virtual object can be displayed on the upper layer of the scene image.

SUMMARY

The inventors of the present disclosure have recognized that, in conventional technologies, the image of the target virtual object may only be displayed on an upper layer of the scene image. Such a display mode is relatively simple and rigid, but cannot be flexibly applied to a variety of application environments.

The present disclosure relates to the field of electronic technology, and more specifically, to a method and device for displaying an image.

According to a first aspect of embodiments of the present disclosure, there is provided a method for displaying an image, comprising:

receiving a setting instruction for performing upper layer display on an image of a target real object in during an augmented reality (AR) video display process of an AR video;

determining the image range information of the image of the target real object in a scene image frame when the scene image frame is captured;

acquiring the image of the target real object in the scene image frame based on the image range information; and setting an image of a preset target virtual object on an upper layer of the scene image frame, and setting the image of the target real object on an upper layer of the image of the target virtual object and the upper layer of the scene image frame based on the image range information, to obtain an AR image frame and display the AR image frame.

According to a second aspect of embodiments of the present disclosure, there is provided a method for displaying an image, comprising:

identifying image range information of images of at least one real object included in a scene image frame when the scene image frame sent by a terminal during an augmented reality (AR) video display process is received, and allocating an object identifier to each of the real objects;

sending the image range information of the image of the at least one real object and the corresponding object identifiers to the terminal;

upon receiving an object identifier of a target real object sent by the terminal, acquiring an image of the target real object according to the image range information corresponding to the object identifier of the target real object in a scene image frame that is currently received:

upon receiving the scene image frame sent by the terminal again, determining the image range information of the image of the target real object in a scene image frame that is received again according to the image of the target real object; and sending the image range information of the image of the target real object to the terminal.

According to a third aspect of embodiments of the present disclosure, there is provided a device for displaying an image, comprising: a processor; and a memory arranged to store an instruction executable by the processor, wherein the processor is configured to perform the method for displaying an image according to the first aspect.

According to a fourth aspect of embodiments of the present disclosure, there is provided a device for displaying an image, comprising: a processor; and a memory arranged to store an instruction executable by the processor, wherein the processor is configured to perform the method for displaying an image according to the second aspect.

According to a fifth aspect of embodiments of the present disclosure, there is provided a system for displaying an image, comprising: a terminal and a server;

wherein the terminal is configured to: receive a setting instruction for performing upper layer display on an image of a target real object during an augmented reality (AR) video display process; determine image range information of the image of the target real object in a scene image frame when the scene image frame is captured; acquire the image of the target real object in the scene image frame based on the image range information; and set an image of a preset target virtual object on an upper layer of the scene image frame, and set the image of the target real object on an upper layer of the image of the target virtual object and the scene image frame based on the image range information, to obtain an AR image frame and display the AR image frame; and the server is configured to: identify image range information of images of at least one real object included in the scene image frame when the scene image frame sent by the terminal during an AR video display process is received, and allocate an object identifier to each of the real objects; send the image range information of the image of the at least one real object and the corresponding object identifiers to the terminal; acquire, upon receiving an object identifier of a target real object sent by the terminal, an image of the target real object according to the image range information corresponding to the object identifier of the target real object in a scene image frame that is currently received; determine, upon receiving the scene image frame sent by the terminal again, the image range information of the image of the target real object in a scene image frame that is received again according to the image of the target real object; and send the image range information of the image of the target real object to the terminal.

According to a sixth aspect of embodiments of the present disclosure, there is provided a terminal comprising a processor and a memory, wherein the memory stores at least one instruction, at least one program, a code set or an instruction set, and the at least one instruction, the at least one program, the code set or the instruction set being loaded and executed by the processor to implement the above method for displaying an image.

According to a seventh aspect of embodiments of the present disclosure, there is provided a computer readable storage medium storing at least one instruction, at least one program, a code set or an instruction set, and the at least one instruction, the at least one program, the code set or the instruction set being loaded and executed by the processor to implement the above method for displaying an image.

According to an eighth aspect of embodiments of the present disclosure, there is provided a server, comprising a processor and a memory, wherein the memory stores at least one instruction, at least one program, a code set or an instruction set, and the at least one instruction, the at least one program, the code set or the instruction set being loaded and executed by the processor to implement the above method for displaying an image According to a seventh aspect of embodiments of the present disclosure, there is provided a computer readable storage medium storing at least one instruction, at least one program, a code set or an instruction set, and the at least one instruction, the at least one program, the code set or the instruction set being loaded and executed by the processor to implement the above method for displaying an image.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure. In the drawings.

DETAILED DESCRIPTION

Figure 1:
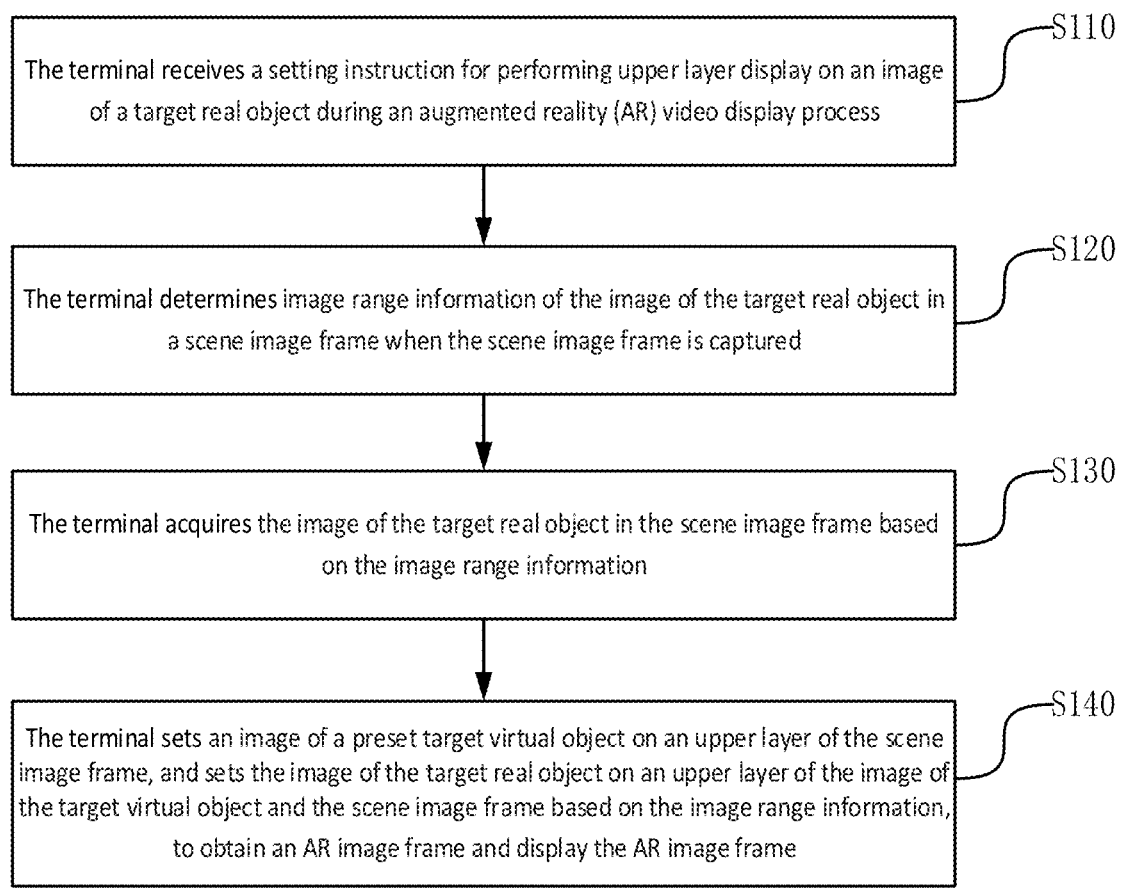
FIG. 1 is a flowchart illustrating a method for displaying an image according to some embodiments.

Various embodiments will be described in detail herein, examples of which are illustrated in the accompanying drawings. When the following description refers to the accompanying drawings, the same numbers in different accompanying drawings may represent the same or similar elements, unless otherwise indicated. The embodiments described in the following embodiments do not represent all embodiments consistent with the present disclosure. Instead, they are merely examples of the device and method consistent with some aspects of the present disclosure as detailed in the appended claims.

There is provided in an embodiment of the present disclosure a method for displaying an image. The method may be implemented by a terminal and a server together.

Herein, the terminal may be a mobile phone, a tablet computer, a desktop computer, a notebook computer, or the like.

The terminal may comprise components such as a processor, a memory and the like. The processor may be a central processing unit (CPU) or the like, and may be configured to receive a setting instruction for performing upper layer display on the image of a target real object, and the like. The memory may be a random-access memory (RAM), a flash memory (Flash), or the like, and may be configured to store the received data, the data required in a processing procedure, the data generated in the processing procedure, and the like, such as image range information.

The terminal may also comprise a transceiver, an input component, a display component, an audio output component, and the like. The transceiver may be configured to perform data transmission with the server. For example, a scene image frame may be sent to the server. The transceiver may comprise a Bluetooth component, a wireless-fidelity (WiFi) component, an antenna, a matching circuit, a modem, and the like. The input component may be a touch screen, a keyboard, a mouse, and the like. The audio output component may be a speaker, a headphone, and the like.

System programs and application programs can be installed in the terminal. The user will use a variety of application programs based on their own needs in the process of using the terminal. The application program with an AR video display function may be installed in the terminal.

Herein, the server may comprise components such as a processor and a memory. The processor may be a CPU, etc., and may be configured to identify the image range information of an image of at least one real object included in the scene image frames, and allocate an object identifier to each of the real objects. The memory may be the RAM, the Flash, or the like, and may be configured to store the received data, the data required in a processing procedure, the data generated in the processing procedure, and the like, such as the scene image frame.

The server may also comprise a transceiver component and the like. The transceiver may be configured to perform data transmission with the terminal. For example, the scene image frame may be sent to the terminal. The transceiver may comprise a Bluetooth component, a WiFi component, an antenna, a matching circuit, a modem, and the like.

Some embodiments of the present disclosure provide a method for displaying an image. As shown in FIG. 1, the method is applicable to a terminal, and the processing procedure may comprise one or more of the following steps.

In step S110, the terminal receives a setting instruction for performing upper layer display on an image of a target real object during an AR video display process.

In some implementations, the terminal may be provided with an application program for displaying the AR video. When the user touches or clicks the icon of the application program, the application program is launched. When the application program is launched, the terminal can turn on a camera. The camera captures the scene image frame of the scene that the camera is pointing to in real time. The terminal can upload the scene image frame to the server in real time.

In some embodiments, prior to step S110, the method further comprises: the terminal uploads the captured scene image frame to the server when the scene image frame is captured, and receives the image range information of the image of at least one real object in the uploaded scene image frame sent by the server and a corresponding object identifier.

Correspondingly, when receiving the scene image frame sent by the terminal in the AR video display process, the server identifies the image range information of the image of at least one real object included in the scene image frame, and allocates an object identifier to each real object.

For example, when receiving a scene image frame of a first frame, the server may identify the images of the real objects therein, and allocate the object identifier for each identified object.

When the scene image frame of a second frame is received, the images of the real objects therein may also be identified. Because the time of the first frame and the second frame are very close, it is very likely that the image does not change a lot. Therefore, the same real object may exist in the first frame and the second frame. At this time, the object identifier may be respectively and individually allocated to each of the real objects of the first frame and the second frame.

Of course, the image of the real object identified in the second frame may also be matched with the image of the real object identified by the first frame. If the matching degree is greater than a preset threshold, the two real objects are considered to be the same object, and can be allocated with the same object identifier.

In some implementations, after receiving the scene image frame, the server may input the scene image frame into a well-trained recognition model. The recognition model may output the image range information of the image of the at least one real object identified in the scene image frame based on the input scene image frame.

Herein, the recognition model is trained based on a large number of training samples. The training samples comprise input images and correctly output results. The image range information may comprise the coordinates of a contour of the real object in the scene image frame, and the coordinates of pixel points occupied by the real object in the scene image frame.

In some embodiments, the server sends the image range information of the image of the at least one real object and the corresponding object identifier to the terminal. At this point, the image range information of the image of the at least one real object in the uploaded scene image frame and the corresponding object identifier exist in the terminal.

In step S120, when capturing the scene image frame, the terminal determines the image range information of the image of the target real object in the scene image frame.

In some implementations, the image range information of the image of the target real object in the scene image frame may be acquired from the server.

In some embodiments, when displaying the uploaded scene image frame, the terminal displays a selection box corresponding to each real object in the at least one real object according to the image range information of the image of the at least one real object.

Figure 2:
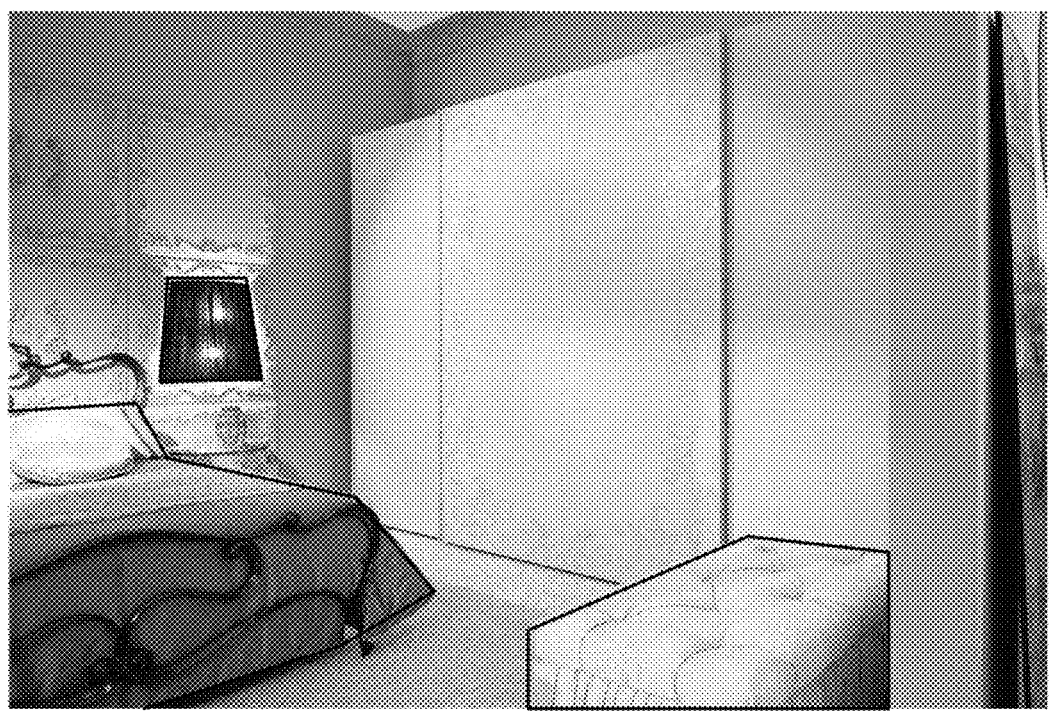
FIG. 2 is a schematic diagram illustrating an interface of an AR application program according to some embodiments.

In some implementations, as shown in FIG. 2, the scene image frame is the scene of a bedroom, for example, in which the server recognizes a bed, a bedside lamp, and a sofa. After receiving the image range information of the image of the bed, the bedside lamp, and the sofa, the terminal circles the image of the bed, the bedside lamp, and the sofa with the selection box.

In some implementations, the user may view the selection box corresponding to each real object in at least one real object in the scene image frame on a screen of the terminal. When the real object has the selection box, it can be applied with the upper layer display.

Figure 3:
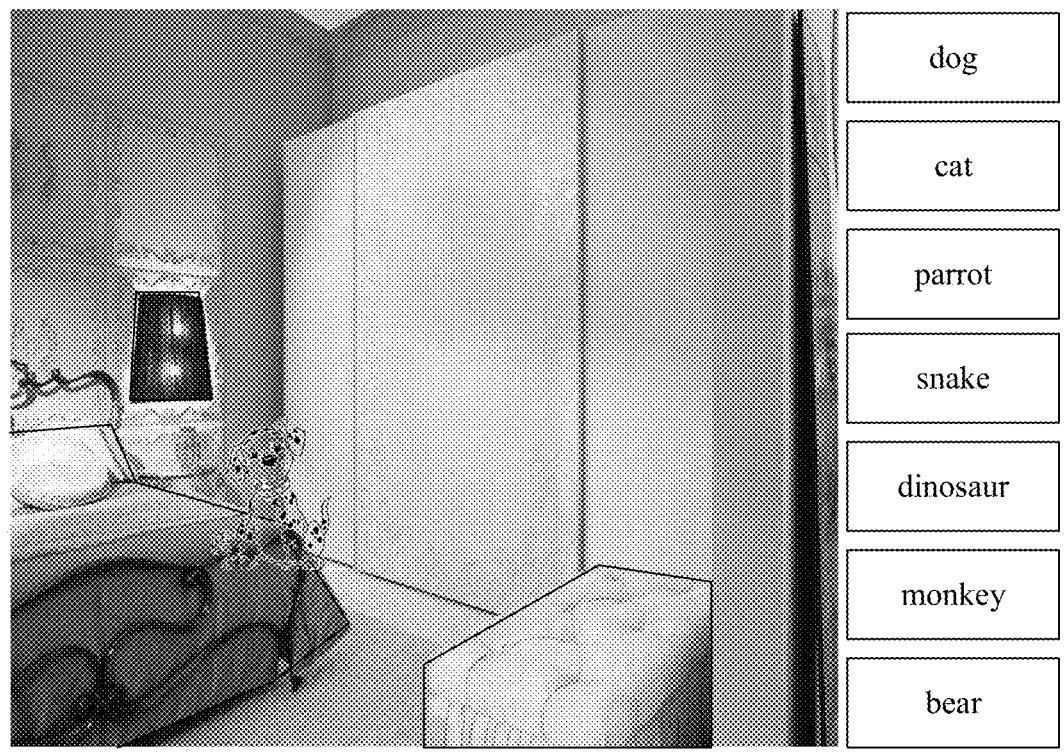
FIG. 3 is a schematic diagram illustrating an interface of an AR application program according to some embodiments.

In some implementations, as shown in FIG. 3, when the user selects a target virtual object "puppy" provided in a sidebar, the image of the virtual puppy will be displayed on the upper layer of the scene image frame.

In some embodiments, the "object" being identified can be a person such as a user. In this case, the person or user can opt out of the identification, data collection, storage and transfer, to protect the user privacy. In some embodiments, a user identification can be generated corresponding to the user profile. The user identification can be selected to such that it does not reveal the user's real identity, to thereby protect the user privacy. For example, the user identifier can be scrambled, randomized, or encrypted, to avoid being directly linked to the user's true identity.

In some embodiments, the terminal receives the setting instructions triggered by a touch signal. The position of the touch signal is within an area indicated by the image range information of the image of the target real object in the currently displayed scene image frame. When the user clicks and drags the virtual puppy to the target real object "bed" and covers part of the image of the bed, the user can click on the area within the contour of the image of the bed. At this point, the setting instruction for performing upper layer display on the image of the target real object is triggered and generated.

In some embodiments, after receiving the setting instruction for performing upper layer display on the image of the target real object, the method further comprises: determining the object identifier of the target real object, according to the image range information of the image of the at least one real object in the current scene image frame sent by the server and the corresponding object identifier, as well as the image range information of the image of the target real object; and sending the object identifier of the target real object to the server.

In some implementations, for example, the server identifies the bed, the bedside lamp and the sofa, and respectively allocates the object identifiers of 001, 003 and 005 to the bed, the bedside lamp and the sofa. The server sends the image range information of the images of the bed, the bedside lamp and the sofa, as well as the corresponding object identifiers thereof to the terminal.

When the terminal detects that the user clicks on the area indicated by the image range information of the target real object "bed," a setting instruction for performing upper layer display on the image of the target real object is triggered and generated. At this point, the terminal can determine that the object identifier of the bed is 001, and send the object identifier 001 to the server.

Correspondingly, when receiving the object identifier of the target real object sent by the terminal, the server acquires the image of the target real object according to the image range information corresponding to the object identifier of the target real object in the currently received scene image frame.

In some implementations, for example, when receiving the object identifier 001 of the bed sent by the terminal, the server acquires the image of the bed according to the image range information corresponding to the object identifier 001 of the bed in the currently-received scene image frame.

It should be noted that the currently-received scene image frame may be a frame image received before it is known that the terminal receives the setting instruction for performing upper layer display on the image of the target real object. An intention of determining the image of the target real object can be that after the user sets the image of the target real object in the terminal, because the video is captured, the positions of the image of the target real object may be deviated in different scene image frames. After the user sets the image of the target real object in the terminal, there is no need to care about the condition of the images of other real objects in the scene image frame. Only the image of the target real object needs to be tracked to inform the terminal of the image range information of the image of the target real object.

In some embodiments, when the scene image frame sent by the terminal is received again, the image range information of the image of the target real object in the scene image frame received again is determined according to the image of the target real object.

In some implementations, in order to track the image of the target real object, the server may first need to acquire an image of the target real object, then extract a first feature of the image of the target real object, and receive a second feature of the scene image frame that is sent by the terminal again. In the second feature, a feature of which the matching degree with the first feature is higher than a preset threshold is found to determine the image range information of the image of the target real object in the image scene frame received again. The server may send the image range information of the image of the target real object to the terminal.

In some embodiments, the step S120 may comprise: when the scene image frame is captured, the terminal uploads the captured scene image frame to the server, and receives the image range information of the image of the target real object in the uploaded scene image frame sent by the server.

In some implementations, the terminal may receive the image range information of the image of the target real object in the uploaded scene image frame sent by the server.

In step S130, the terminal acquires the image of the target real object in the scene image frame based on the image range information.

In some implementations, the terminal may acquire the image of the target real object in the scene image frame based on the image range information.

In step S140, the terminal sets the image of the preset target virtual object on the upper layer of the scene image frame, and sets the image of the target real object on the upper layer of the image of the target virtual object and the scene image frame based on the image range information, to acquire an AR image frame and display the AR image frame.

In some implementations, the terminal may place the image of the preset target virtual object on a first layer, place the scene image frame on a second layer, and place the image of the target real object on a third layer. The terminal may set the third layer to be the uppermost top layer, the first layer to be the middle layer, and the second layer to be the bottommost layer.

Figure 4:
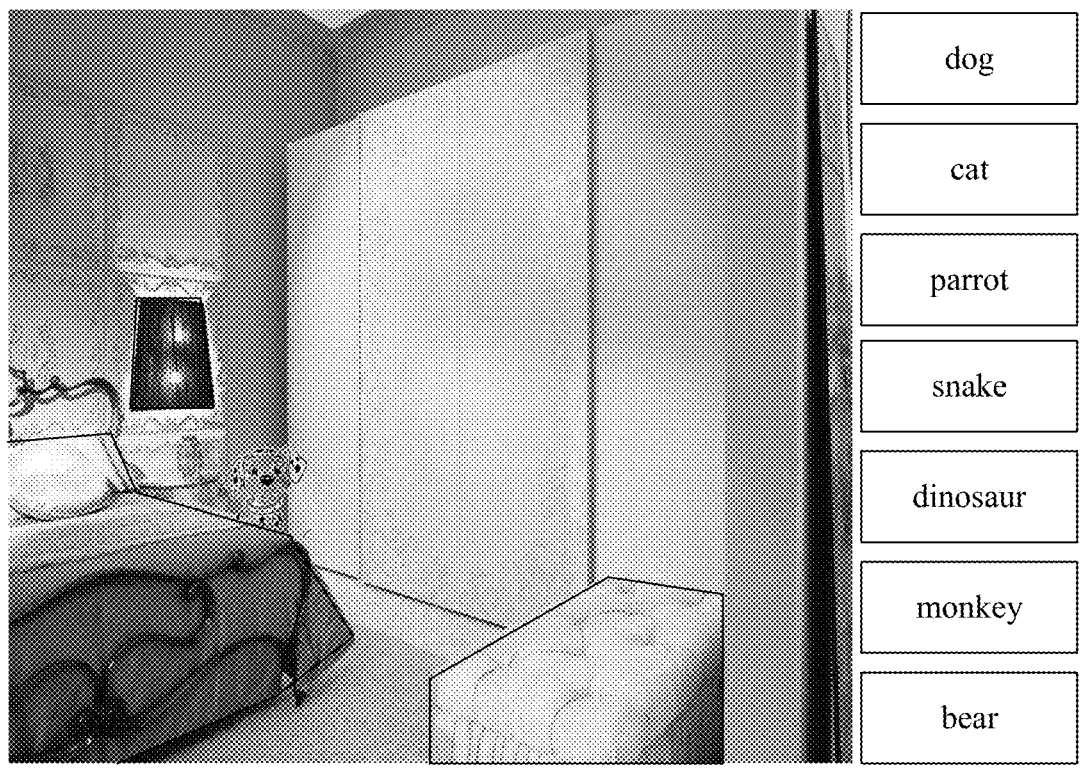
FIG. 4 is a schematic diagram illustrating an interface of an AR application program according to some embodiments.

After setting, these layers are overlapped to display the final effects. In an example, the final effects can be seen in FIG. 4. It should be noted that, for example, in the scene shown in FIG. 4, if the image of the puppy is displayed on the upper layer of the image of the bed, it does not look real. If the image of the puppy can be displayed on the lower layer of the image of the bed by using the methods as described in the present disclosure, then the sense of reality that the puppy is hidden behind the bed can be given to the user visually.

In some embodiments, the above step S130 may comprise: acquiring, by the terminal, the image range information of the image of the target virtual object; and acquiring the image of the target real object in the scene image frame based on the image range information if it is determined that the image of the target virtual object and the image of the target real object overlaps according to the image range information of the image of the target virtual object and the image range information of the image of the target real object.

In some implementations, if the image of the target virtual object and the image of the target real object overlaps, the terminal may display the image part that is overlapped and belongs to the target real object when receiving the setting instruction for performing upper layer display on the image of the target real object, and hide the image part that is overlapped and belongs to the target virtual object.

However, if the image of the target virtual object and the image of the target real object do not overlap, the terminal may ignore the setting instruction and does not perform any operation when receiving the setting instruction for performing upper layer display on the image of the target real object.

According to the methods provided by the embodiments of the present disclosure, the setting instruction for performing upper layer display on the image of the target real object is received during the AR video display process.

The image range information of the image of the target real object in the scene image frame is determined when the scene image frame is captured. The image of the target real object in the scene image frame is acquired based on the image range information. The image of the preset target virtual object is set on the upper layer of the scene image frame, and the image of the target real object is set on the upper layer of the image of the target virtual object and the scene image frame based on the image range information, to obtain the AR image frame and display the AR image frame.

In the above process, the image of the target virtual object can be displayed on the upper layer of the scene image, which increases the display diversity, so that the display mode can be flexibly applied to various application environments.

Figure 5:
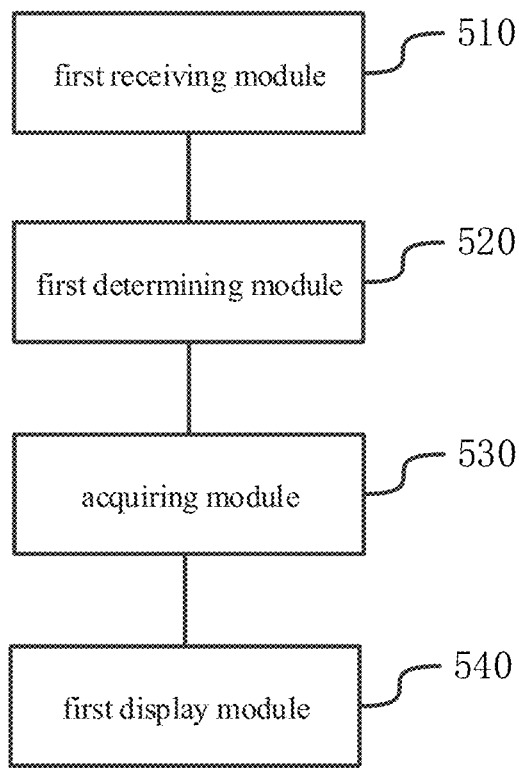
FIG. 5 is a schematic diagram illustrating a structure of a device configured to display an image according to some embodiments.

Some other embodiments of the present disclosure provide a device for displaying an image. As shown in FIG. 5, the device includes:

a first receiving module 510 configured to receive a setting instruction for performing upper layer display on an image of a target real object during an AR video display process;

a first determining module 520 configured to determine image range information of image of the target real object in a scene image frame when the scene image frame is captured;

an acquiring module 530 configured to acquire the image of the target real object in the scene image frame based on the image range information; and a first display module 540 configured to set an image of a preset target virtual object on an upper layer of the scene image frame, and set the image of the target real object on an upper layer of the image of the target virtual object and the scene image frame based on the image range information, to obtain an AR image frame and display the AR image frame.

In some embodiments, the device further includes an uploading module and a second receiving module, wherein the uploading module is configured to upload the captured scene image frame to a server when the scene image frame is captured, and the second receiving module is configured to receive image range information of images of at least one real object in the uploaded scene image frame and corresponding object identifiers that are sent by the server.

In some embodiments, the first receiving module 510 is configured to receive a setting instruction triggered by a touch signal, wherein the touch signal is located within an area indicated by the image range information of the image of the target real object in a currently displayed scene image frame.

In some embodiments, the device further includes a second determining module and a sending module, wherein the second determining module is configured to determine an object identifier of the target real object according to the image range information of the images of the at least one real object in the current scene image frame and the corresponding object identifiers that are sent by the server and the image range information of the image of the target real object; and the sending module is configured to send the object identifier of the target real object to the server.

The first determining module 520 is configured to upload the captured scene image frame to the server when the scene image frame is captured, and receive the image range information of the image of the target real object in the uploaded scene image frame sent by the server.

In some embodiments, the device further includes: a second display module configured to display a selection box corresponding to each of the real objects in the at least one real object according to the image range information of the image of the at least one real object when the uploaded scene image frame is displayed.

Figure 6:
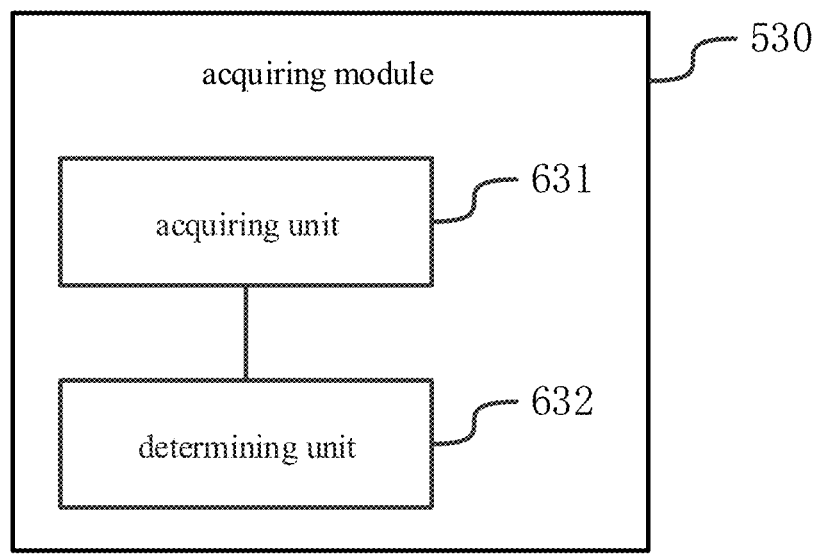
FIG. 6 is a schematic diagram illustrating a structure of a device configured to display an image according to some embodiments.

In some embodiments, as shown in FIG. 6, the acquiring module 530 includes:

an acquiring unit 631 configured to acquire image range information of the image of the target virtual object; and a determining unit 632 configured to acquire the image of the target real object in the scene image frame based on the image range information if it is determined that the image of the target virtual object and the image of the target real object overlaps according to the image range information of the image of the target virtual object and the image range information of the image of the target real object.

Figure 7:
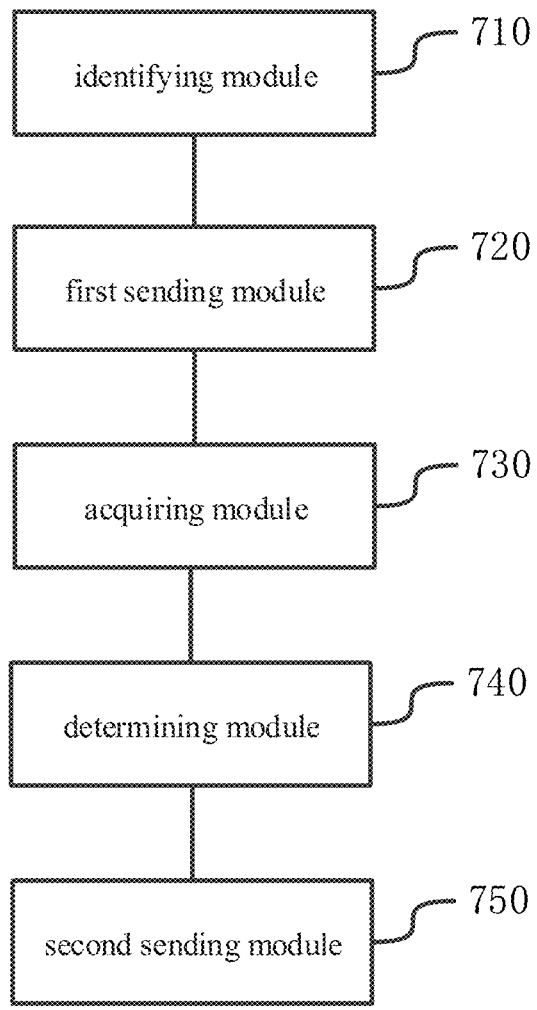
FIG. 7 is a schematic diagram illustrating a structure of a device configured to display an image according to some embodiments.

Some other embodiments of the present disclosure provide a device configured to display an image, as illustrated in FIG. 7. The device includes:

an identifying module 710 configured to identify the image range information of the image of at least one real object included in a scene image frame when the scene image frame sent by a terminal during an AR video display process is received, and allocate an object identifier to each of the real objects:

a first sending module 720 configured to send the image range information of the image of the at least one real object and the corresponding object identifier to the terminal;

an acquiring module 730 configured to acquire, upon receiving an object identifier of a target real object sent by the terminal, an image of the target real object according to the image range information corresponding to the object identifier of the target real object in a scene image frame that is currently received;

a determining module 740 configured to determine, upon receiving the scene image frame sent by the terminal again, the image range information of the image of the target real object in a scene image frame that is received again according to the image of the target real object; and a second sending module 750 configured to send the image range information of the image of the target real object to the terminal.

The various modules can perform operations similar to those described above with respect to the other embodiments, which are not repeated herein.

The various device components, blocks, or portions may have modular configurations, or are composed of discrete components, but nonetheless may be referred to as "modules" in general. In other words, the "modules" referred to herein may or may not be in modular forms.

The image of the target virtual object can be displayed on the upper layer of the scene image, which increases display diversity, so that the display mode can be flexibly applied to various application environments.

It should be noted that the device configured to display an image provided in the above embodiments is exemplified only by taking the division of functional modules as examples when the device displays images. In practice, the above-described functions may be assigned to different functional modules or portions for completion in accordance with requirements, that is, the internal structure of the terminal or server may be divided into different functional modules, blocks, or portions to complete all or part of the functions described above.

In addition, the device configured to display an image and method for displaying an image provided in the above embodiments may fall into the same concept, and the specific implementation process thereof can be referred to the method embodiments and may not be described again therein.

Some other embodiments of the present disclosure provide a system configured to display an image, including a terminal and a server.

The terminal is configured to: receive a setting instruction for performing upper layer display on an image of a target real object during an AR video display process; determine image range information of the image of the target real object in a scene image frame when the scene image frame is captured; acquire the image of the target real object in the scene image frame based on the image range information; and set an image of a preset target virtual object on an upper layer of the scene image frame, and set the image of the target real object on the upper layer of the image of the target virtual object and the scene image frame based on the image range information, to obtain an AR image frame and display the AR image frame.

The server is configured to: identify image range information of images of at least one real object included in the scene image frame when the scene image frame sent by the terminal during an AR video display process is received, and allocate an object identifier to each of the real objects; send the image range information of the image of the at least one real object and the corresponding object identifier to the terminal; acquire, upon receiving an object identifier of a target real object sent by the terminal, an image of the target real object according to the image range information corresponding to the object identifier of the target real object in a scene image frame that is currently received; determine, upon receiving the scene image frame sent by the terminal again, the image range information of the image of the target real object in a scene image frame that is received again according to the image of the target real object; and send the image range information of the image of the target real object to the terminal.

With respect to the system of the above embodiments, the various operations performed by the terminal and the server perform operations may be similar to those described above with respect to the embodiments of the method, and thus are not repeated herein.

Figure 8:
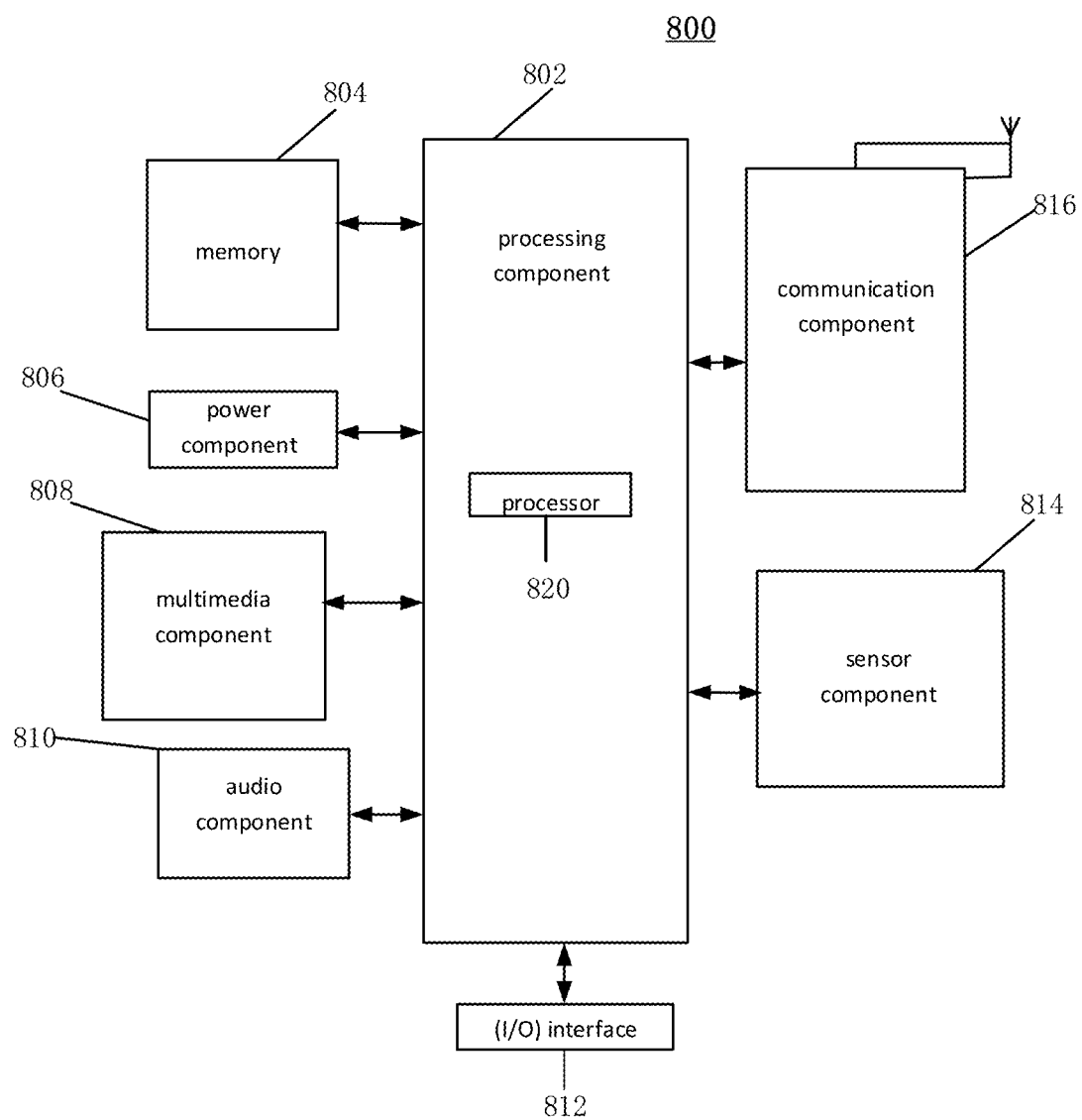
FIG. 8 is a schematic diagram illustrating a structure of a terminal according to some embodiments.

In some other embodiments of the present disclosure provides a device 800 is provided as illustrated in FIG. 8.

Referring to FIG. 8, the device 800 may include one or more of the following components: a processing component 802, memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, s, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816.

The I/O interface 812 provides an interface between the processing component 802 and peripheral interface modules, such as a keyboard, a click wheel, buttons, and the like. The buttons may include, but not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800.

The sensor component 814 may include a proximity sensor configured to detect the presence of nearby objects without any physical contact. The sensor component 814 may also include an optoelectronic sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, or 3G, or a combination thereof.

In some embodiments, the communication component 816 receives a broadcast signal or broadcast associated information from an external broadcast management system via a broadcast channel.

In some embodiments, the communication component 816 further includes a near-field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a computer-readable storage medium including instructions, such as included in the memory 804, executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

Some other embodiments of the present disclosure provide a non-transitory computer-readable storage medium, wherein the instructions in the storage medium, when executed by the process of the terminal, causes the terminal to perform the following steps:

receiving a setting instruction for performing upper layer display on an image of a target real object during an AR video display process:

determining image range information of the image of the target real object in a scene image frame when the scene image frame is captured;

acquiring the image of the target real object in the scene image frame based on the image range information; and setting an image of a preset target virtual object on an upper layer of the scene image frame, and setting the image of the target real object on an upper layer of the image of the target virtual object and the scene image frame based on the image range information, to obtain an AR image frame and display the AR image frame.

In some embodiments, prior to receiving a setting instruction for performing upper layer display on an image of a target real object, the steps further include: uploading the captured scene image frame to a server when the scene image frame is captured, and receiving image range information of the images of at least one real object in the uploaded scene image frame and corresponding object identifiers that are sent by the server.

In some embodiments, the receiving a setting instruction for performing upper layer display on an image of a target real object comprises: receiving a setting instruction triggered by a touch signal, wherein the touch signal is located within an area indicated by the image range information of the image of the target real object in a currently displayed scene image frame.

After the receiving a setting instruction for performing upper layer display on an image of a target real object, the steps further includes: determining an object identifier of the target real object according to the image range information of the image of the at least one real object in the current scene image frame and the corresponding object identifiers that are sent by the server, and the image range information of the image of the target real object; and sending the object identifier of the target real object to the server.

In some embodiments, the determining image range information of the image of the target real object in a scene image frame when the scene image frame is captured comprises: uploading the captured scene image frame to the server when the scene image frame is captured, and receiving the image range information of the image of the target real object in the uploaded scene image frame sent by the server.

In some embodiments, the steps further include: displaying a selection box corresponding to each of the at least one real object according to the image range information of the image of the at least one real object when the uploaded scene image frame is displayed.

In some embodiments, the acquiring the image of the target real object in the scene image frame based on the image range information includes:

acquiring image range information of the image of the target virtual object; and acquiring the image of the target real object in the scene image frame based on the image range information the image of the target real object if it is determined that the image of the target virtual object and the image of the target real object overlaps according to the image range information of the image of the target virtual object and the image range information of the image of the target real object.

Figure 9:
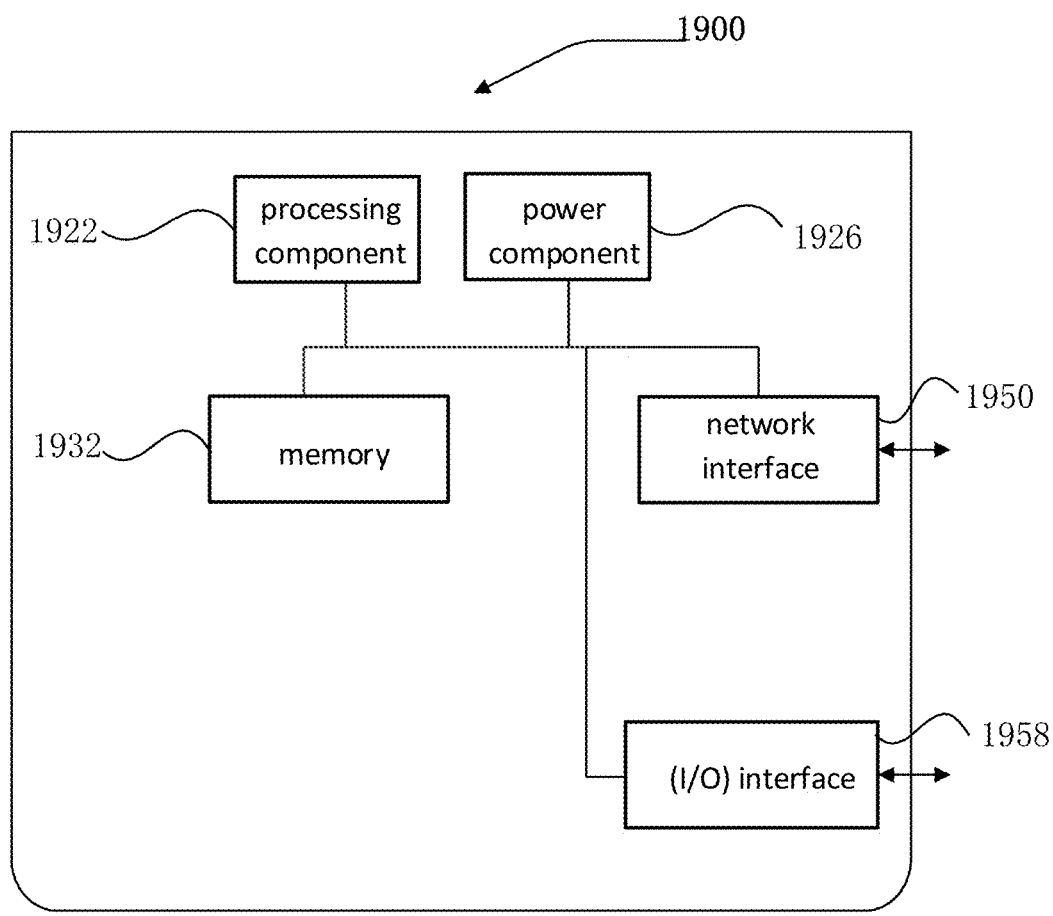
FIG. 9 is a schematic diagram illustrating a structure of a server according to some embodiments.

FIG. 9 is a block diagram of a server 1900 according to some embodiments. The server 1900 may include a processing component or processing circuit 1922 which may further include one or more processors, and memory resource represented by a memory device 1932 configured to store instructions executable by the processing component or processing circuit 1922, such as application programs. The application programs stored in the memory 1932 may include one or more modules, each of which corresponds to a set of instructions. Further, the processing component or processing circuit 1922 may be configured to execute the instructions for performing the above methods for displaying an image.

The server 1900 may further include a power component 1926 configured to perform power management of the server 1900, a wired or wireless network interface 1950 configured to connect the server 1900 to the network, and an input/output (I/O) interface 1958. The server 1900 may operate an operating system based on and stored in the memory 1932, such as Windows Server™, Mac OS X™, Unix™, Linux™, FreeBSD™, and the like.

The server 1900 may include a memory device, and one or more programs, wherein the one or more than one program is stored in the memory, and one or more than one above processor is configured to execute the instructions contained in the one or more programs for performing the following operations:

identifying image range information of images of at least one real object included in a scene image frame when the scene image frame sent by a terminal during an AR video display process is received, and allocating an object identifier to each of the real objects:

sending the image range information of the image of the at least one real object and the corresponding object identifier to the terminal;

upon receiving an object identifier of a target real object sent by the terminal, acquiring an image of the target real object according to the image range information corresponding to the object identifier of the target real object in a scene image frame that is currently received:

upon receiving the scene image frame sent by the terminal again, determining the image range information of the image of the target real object in a scene image frame that is received again according to the image of the target real object; and sending the image range information of the image of the target real object to the terminal.

To provide for interaction with a user, implementations of the subject matter described in this specification can be implemented with a computer and/or a display device not limited to the LCD display. Other devices can be employed, such as a VR/AR device, a head-mount display (HMD) device, a head-up display (HUD) device, smart eyewear (e.g., glasses), a CRT (cathode-ray tube), light-emitting diode (LED) display, an organic LED (OLED) display, a micro LED (µLED) display, a quantum-dot LED (QLED) display, TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Communications between various devices such mobile terminals, and/or between terminals and servers, can be implemented through software or communication apps such as WhatsApp, Snapchat, Skype, WeChat, QQ, or other Internet communication or social media software.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this disclosure can be implemented as operations performed by a data processing apparatus on data stored on one or more computer-readable storage devices or received from other sources.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for displaying an image, comprising:
   receiving a setting instruction for performing upper layer display on an image of a target real object;
   determining, upon capture of a scene image frame, image range information of the image of the target real object in the scene image frame;
   acquiring the image of the target real object in the scene image frame based on the image range information of the image of the target real object; and setting an image of a preset target virtual object on an upper layer of the scene image frame, and setting the image of the target real object on an upper layer of the image of the preset target virtual object and the scene image frame based on the image range information of the image of the target real object, the method further comprising, prior to the receiving the setting instruction for performing upper layer display on the image of the target real object;

uploading, upon capture of the scene image frame, the scene image frame to a server, and receiving image range information of images of at least one real object of a plurality of real objects in the scene image frame and corresponding object identifiers for the plurality of real objects that are sent by the server;

wherein:

the receiving the setting instruction for performing upper layer display on the image of the target real object comprises: receiving a setting instruction triggered by a touch signal, wherein the touch signal is located within an area indicated by the image range information of the image of the target real object in the scene image frame that is currently-displayed;

after the receiving the setting instruction for performing upper layer display on the image of the target real object, the method further comprises: determining an object identifier of the target real object according to the image range information of the images of at least one real object of the plurality of real objects in the scene image frame and the corresponding object identifiers for the plurality of real objects that are sent by the server, and the image range information of the image of the target real object; and sending the object identifier of the target real object to the server; and the determining, upon capture of the scene image frame, the image range information of the image of the target real object in the scene image frame comprises: uploading the scene image frame to the server when the scene image frame is captured, and receiving the image range information of the image of the target real object in the scene image frame sent by the server.

2. The method according to claim 1, further comprising: displaying a selection box corresponding to each of the plurality of real objects according to the image range information of the images of the at least one real object of the plurality of real objects when the scene image frame is displayed.

3. The method according to claim 1, wherein the acquiring the image of the target real object in the scene image frame based on the image range information of the image of the target real object comprises:

acquiring image range information of the image of the preset target virtual object; and acquiring the image of the target real object in the scene image frame based on the image range information of the image of the target real object upon a determination that the image of the preset target virtual object and the image of the target real object overlaps according to the image range information of the image of the preset target virtual object and the image range information of the image of the target real object.

4. The method according to claim 1, further comprising: obtaining an augmented reality (AR) image frame based on the preset target virtual object; and
displaying the AR image frame.

5. The method according to claim 4, further comprising: displaying an AR video based on the AR image frame.

6. A device configured to perform the method of claim 1, the device comprising:
a processing circuit; and
a memory device configured to store instructions executable by the processing circuit to implement the method according to claim 1.

7. The device according to claim 6, wherein the processing circuit is further configured to:
display a selection box corresponding to each of the plurality of real objects according to the image range information of the images of the at least one real object of the plurality of real objects when the scene image frame is displayed.

8. The device according to claim 7, wherein the processing circuit is further configured to:
acquire image range information of the image of the preset target virtual object; and
acquire the image of the target real object in the scene image frame based on the image range information of the image of the target real object upon a determination that the image of the preset target virtual object and the image of the target real object overlaps according to the image range information of the image of the preset target virtual object and the image range information of the image of the target real object.

9. A terminal, comprising a processing circuit and a memory device, wherein the memory device stores instructions, when executed by the processing circuit, cause the processing circuit to implement the method according to claim 1.

10. A non-transitory computer-readable storage medium storing instructions for execution by a processing circuit to implement the method according to claim 1.

11. A non-transitory computer-readable storage medium storing instructions for execution by a processing circuit to implement the method according to claim 2.

12. A non-transitory computer-readable storage medium storing instructions for execution by a processing circuit to implement the method according to claim 3.

13. A method for displaying an image, comprising:
upon receiving a scene image frame sent by a terminal, identifying image range information of images of at least one real object of a plurality of real objects included in the scene image frame, and allocating corresponding object identifiers for the plurality of real objects;

sending the image range information of the image of the at least one real object of the plurality of real objects and the corresponding object identifiers for the plurality of real objects to the terminal;

upon receiving an object identifier of a target real object sent by the terminal, acquiring an image of the target real object according to image range information of the image of the target real object and the object identifier of the target real object in the scene image frame that is currently received;

upon receiving the scene image frame sent by the terminal again, determining the image range information of the image of the target real object in the scene image frame that is received again according to the image of the target real object; and sending the image range information of the image of the target real object to the terminal.

14. A device configured to perform the method of claim 13, the device comprising:
a processing circuit; and a memory device configured to store instructions executable by the processing circuit to implement the method according to claim 13.

15. A server, comprising a processing circuit, and a memory device storing instructions for execution by the processing circuit to implement the method according to claim 13.

16. A non-transitory computer-readable storage medium storing instructions for execution by a processing circuit to implement the method according to claim 13.

17. A system configured to display an image, comprising a terminal and a server;

wherein the terminal, comprising a first processing circuit and a first memory device configured to store instructions executable by the first processing circuit, is configured to: receive a setting instruction for performing upper layer display on an image of a target real object during an augmented reality (AR) video display process; determine, upon capture of a scene image frame, image range information of the image of the target real object in the scene image frame; acquire the image of the target real object in the scene image frame based on the image range information of the image of the target real object; and set an image of a preset target virtual object on an upper layer of the scene image frame, and set the image of the target real object on an upper layer of the image of the preset target virtual object and the scene image frame based on the image range information of the image of the target real object, to obtain an AR image frame and display the AR image frame; and the server, comprising a second processing circuit and a second memory device configured to store instructions executable by the second processing circuit is configured to: identify, upon receiving the scene image frame sent by the terminal during the AR video display process, image range information of images of at least one real object of a plurality of real objects included in the scene image frame, and allocate corresponding objects identifiers for the plurality of real objects; send the image range information of the image of the at least one real object of the plurality of real objects and the corresponding object identifiers for the plurality of real objects to the terminal; acquire, upon receiving an object identifier of the target real object sent by the terminal, the image of the target real object according to the image range information of the image of the target real object and the object identifier of the target real object in the scene image frame that is currently received; determine, upon receiving the scene image frame sent by the terminal again, the image range information of the image of the target real object in the scene image frame that is received again according to the image of the target real object; and send the image range information of the image of the target real object to the terminal.

\* \* \* \* \*